United States Patent [19]
Kamoda et al.

[11] Patent Number: 5,512,970
[45] Date of Patent: Apr. 30, 1996

[54] FILM LOADING APPARATUS USING PLANET GEAR

[75] Inventors: Takashi Kamoda, Omiya; Takashi Mashiko, Ibaraki, both of Japan

[73] Assignee: Fuji Photo Optical Co., Ltd., Omiya, Japan

[21] Appl. No.: 423,459

[22] Filed: Apr. 19, 1995

[30] Foreign Application Priority Data

Apr. 25, 1994 [JP] Japan ................................ 6-110496

[51] Int. Cl.⁶ .................................................... G03B 1/18
[52] U.S. Cl. ............................................................ 354/173.1
[58] Field of Search ............................ 354/212, 213, 354/214, 173, 173.1

[56] References Cited

U.S. PATENT DOCUMENTS 5,365,301 11/1994 Sugita et al. ......................... 354/173.1
5,373,336 12/1994 Sugita ..................................... 354/212

*Primary Examiner*—David M. Gray
*Attorney, Agent, or Firm*—Ronald R. Snider

[57] ABSTRACT

A film loading apparatus for enabling a smooth initial film feeding operation by preventing a planet gear from being sent flying to a rewinding gear. The rewinding gear is connected to a fork gear which engages a take-up shaft of a patrone, and the feeding gear is connected to a one-tooth sprocket having a pawl tooth which engages a perforation of a film at the time of initial film feeding. A sun gear and the planet gear are connected to the pinion of the motor for taking up a film, and the planet gear moves between the position at which the planet gear meshes with the feeding gear and the position at which the planet gear meshes with the rewinding gear. A stopper member is provided at the position at which the stopper member checks the movement of the planet gear when the planet gear is disengaged from the feeding gear and sent flying reward the rewinding gear at the time of initial film feeding and at which the stopper member engages the planet gear when the planet gear is reversely rotated and moved toward the rewinding gear. This structure prevents the planet gear from being sent flying and meshing with the planet gear at the time of initial film feeding.

4 Claims, 3 Drawing Sheets

FILM LOADING APPARATUS USING PLANET GEAR

BACKGROUND OF THE INVENTION

This application claims the priority of Japanese Patent Application No. 6-110496 filed on Apr. 25, 1994.

1. Field of the Invention

The present invention relates to a film loading apparatus for a camera and, more particularly, to the structure of a film loading apparatus which uses a planet gear for switching between an initial film feeding operation and a film rewinding operation by the movement of the planet gear.

2 Description of the Related Art

In a camera, a motor is used not only for a film winding operation for winding a film for every exposure, but also for an initial feeding operation for winding a predetermined amount of the forward end of the loaded film around a take-up spool and setting the film ready for photographing, and for a film rewinding operation for rewinding the film into the patrone after it is fully exposed. It is possible to select the initial feeding operation or the rewinding operation by switching a planet gear.

FIG. 4 is a bottom view of the structure of a conventional film loading apparatus for a camera. In FIG. 4, a fork gear 1 which engages a film patrone take-up shaft and a rewinding gear 2 which meshes with the fork gear 1 are provided on the right-hand side, and a spool 4 for taking up film 3 is provided on the left-hand side. The pinion 5 of a motor is connected to the spool 4 via a plurality of gears, and a planet gear mechanism including a sun gear 6 and a planet gear 7 meshes with the pinion 5. The planet gear 7 slides along a guide groove 8.

One-tooth sprocket 10 having a pawl tooth 9 is integrally provided with a feeding gear 11 in such a manner that the pawl tooth 9 engages a perforation of the film 3. Since the planet gear 7 slides along the guide groove 8 in accordance with the direction of rotation, the planet gear selectively meshes with the rewinding gear 7 and the feeding gear 11.

According to the above-described structure, when the spool 4 is rotated clockwise (hereinunder referred to as "normally") by the motor, the sun gear 6 is normally rotated and the planet gear 7 is thereby rotated counterclockwise (hereinunder referred to as "reversely"). The planet gear 7 then moves to the position indicated by the solid line and meshes with the feeding gear 11 so as to rotate the one-tooth sprocket 10 clockwise. By the rotation of the one-tooth sprocket 10, the forward end of the film 3 is fed toward the spool 4 and the fed film 3 is taken up by the spool 4. On the other hand, if the motor is reversely rotated when the film 3 is fully exposed, the sun gear 6 is reversely rotated, and the planet gear 7 moves to the position indicated by the broken line so as to mesh with the rewinding gear 2. In this case, the fork gear 1 is rotated counterclockwise, thereby rewinding the film 3 into the patrone. In this manner, if the planet gear 7 is used, it is possible to selectively switch between the initial film feeding operation and the film refunding operation by changing the direction of rotation of the motor.

In the above film loading apparatus, however, there is a problem that the planet gear 7 which engages the feeding gear 11 is sent flying toward the rewinding gear 2 at the time of initial film feeding. More specifically, when the film 3 is fed by the one-tooth sprocket 10, since the pawl tooth 9 engages a perforation and therefore a load is applied to the one-tooth sprocket 10, the rotation of the one-tooth sprocket 10 is slow. When this engagement is released, the one-tooth sprocket 10 suddenly rotates at a high rate. When the one-tooth sprocket 10 and the feeding gear 11 suddenly rotate at a high rate, the planet gear 7 is disengaged from the feeding gear 11. In another case, when the pawl tooth 9 is not smoothly engaged with a perforation and it is engaged with the perforation after strongly pressing the film 3, the reaction against the sudden motion of the one-tooth sprocket 10 at the time of engagement sends the planet gear 7 flying.

If the planet gear 10 is sent flying toward the rewinding gear 2 with these causes, and it meshes with the rewinding gear 2, the fork gear 1 rotates at a predetermined rate. The film 3 is pulled in accordance with the difference between the rotation rates of the spool 4 and the fork gear 1, and in the worst case the film loading operation is stopped.

SUMMARY OF THE INVENTION

Accordingly, it is an object of the present invention to eliminate the above-described problems in the related art and to provide a film loading apparatus using a planet gear for a camera which is capable of smoothly feeding film without sending the planet gear flying toward the rewinding gear.

To achieve this end, the present invention provides a film loading apparatus using a planet gear comprising: a planet gear mechanism for switching between two actuating gears which provided for two different (and optional) operations; and a stopper member provided at the position at which said stopper member checks the movement of said planet gear when said planet gear is disengaged from one actuating gear and sent flying toward another actuating gear at the time of one operation and at which said stopper member engages said planet gear when said planet gear is reversely rotated and moved toward said another actuating gear.

To achieve this end, the present invention provides a film loading apparatus using a planet gear comprising: a feeding gear for initial film feeding; a rewinding gear for rewinding a film; a planet gear disposed in such a manner as to move between the position at which the planet gear meshes with the feeding gear and the position at which the planet gear meshes with the rewinding gear by changing the direction of rotation of the planet gear; and a stopper member provided at the position at which the stopper member checks the movement of the planet gear when the planet gear is disengaged from the feeding gear and sent flying toward the rewinding gear at the time of initial film feeding and at which the stopper member engages the planet gear when the planet gear is reversely rotated and moved toward the rewinding gear.

As the stopper member, a tooth-like member or a pin member is usable which engages the planet gear when the planet gear retunes from the feeding gear toward the rewinding gear. The tooth-like member is advantageous in that a large stopper is produced than a pin member.

The feeding gear may be integrally provided with a one-tooth sprocket which engages a perforation of film for the purpose of initial feeding, and the rewinding gear may be connected to a fork gear which engages the take-up shaft of a film patrone. The planet gear may be connected to a sun gear and the sun gear may be connected to a take-up motor.

According to this structure, even if the planet gear is sent flying at the time of initial feeding, the movement of the planet gear toward the rewinding gear is checked by the stopper in the shape of, for example, a tooth. At the time of film rewinding, the planet gear is reversely rotated and disengaged from the feeding gear, and the planet gear moves to the position at which it meshes with the rewinding gear while meshing with the stopper. In this manner, the intermeshing of the planet gear and the rewinding gear at the time of initial film feeding is prevented.

The above and other objects, features and advantages of the present invention will become clear from the following description of the preferred embodiment thereof, taken in conjunction with the accompanying drawings.

BRIEF DESCRIPTION OF THE DRAWINGS

FIG. 3 (B) shows the operation of the stopper in the embodiment when the planet gear is switched for a rewinding operation.

DESCRIPTION OF THE PREFERRED EMBODIMENT

Figure 1:
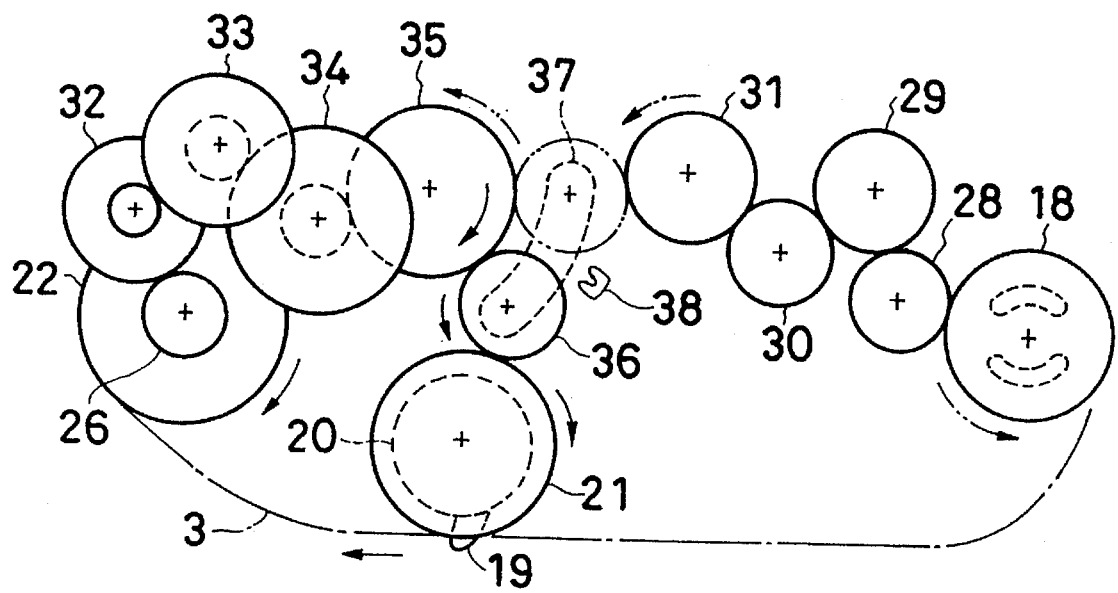
FIG. 1 shows the structure of an embodiment of a film loading apparatus using a planet gear according to the present invention.
Figure 2:
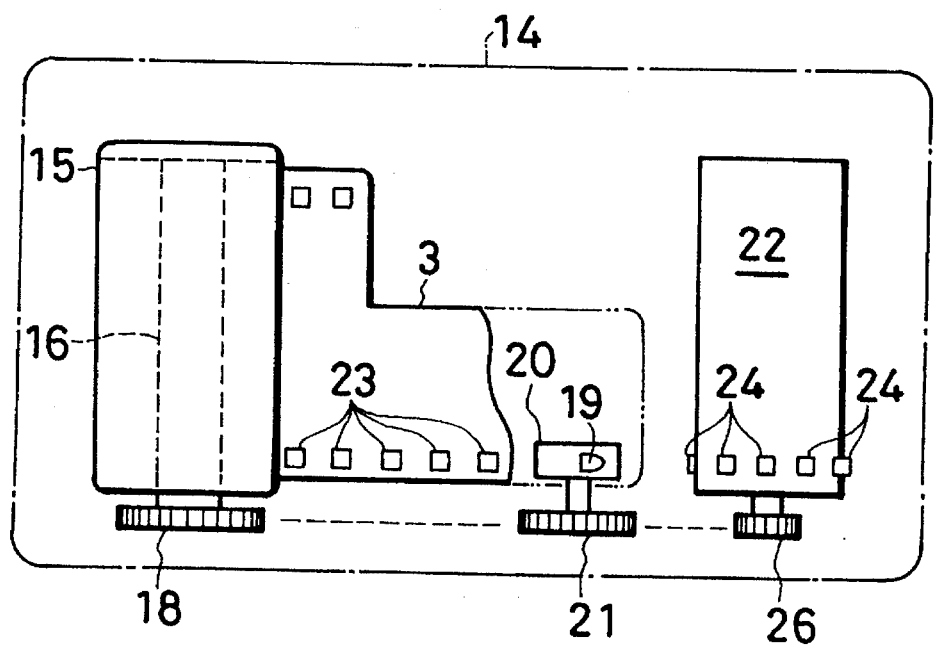
FIG. 2 shows the embodiment shown in FIG. 1 mounted in a camera in the state of initial film feeding.

FIG. 1 shows the structure of an embodiment of a film loading apparatus using a planet gear according to the present invention, and FIG. 2 shows the embodiment mounted in a camera in the state of initial film feeding. In FIG. 2, a film patrone 15 is disposed in a patrone chamber in a camera 14, and an engaging portion of a fork gear 18 engages a take-up shaft 16 of the patrone 15. A feeding gear 21 is disposed under a one-tooth sprocket 20 having a pawl tooth 19. A spool 22 for taking up a film 3 in the patrone 13 is provided and catches 24 for catching perforations 23 are formed on the peripheral surface of the spool 22. A motor pinion 26 is attached to the underside of the spool 22.

In FIG. 1, a rewinding gear 31 is connected to the fork gear 18 on the right-hand side via gears 28 to 30, and a sun gear 35 and a planet gear 36 which constitute a planet gear mechanism are connected to the motor pinion 26 on the underside of the spool 22 on the left-hand side via gears 32 to 34. The planet gear 36 is slidable along a guide groove 37 so as to move between the position at which the planet gear 36 meshes with the feeding gear 21 and the position at which the planet gear 36 meshes with the rewinding gear 31.

When the sun gear 35 rotates normally (clockwise), the planet gear 36 rotates reversely (counterclockwise) and moves toward the feeding gear 21. On the other hand, when the sun gear 35 rotates reversely, the planet gear 36 rotates normally and moves toward the rewinding gear 31. The one-tooth sprocket 20 having the pawl tooth 19 which engages a perforation of the film 3, as described above, is integrally connected to the feeding gear 21.

A stopper 38 is provided at the position at which the teeth portion of the planet gear 36 comes into contact with the stopper 38 on the way from the feeding gear 21 to the rewinding gear 31 at the time of a normal rotation of the planet gear 36 and on the way from the rewinding gear 31 to the feeding gear 21 at the time of a reverse rotation of the planet gear 36. The stopper 38 checks the movement of the planet gear 36 in such a manner as to stop the rotation of the planet gear 36 when the planet gear 36 is reversely rotated and sent flying from the feeding gear 21 toward the rewinding gear 31.

Figure 3A:
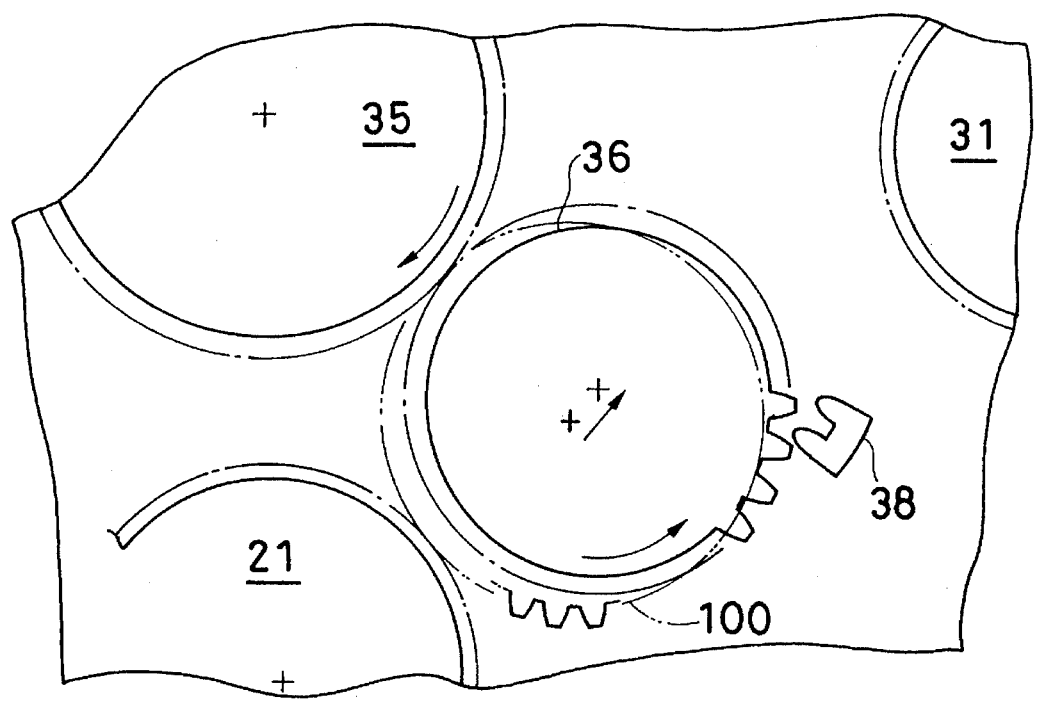
FIG. 3 (A) shows the operation of the stopper in the embodiment when the planet gear is sent flying.
Figure 3B:
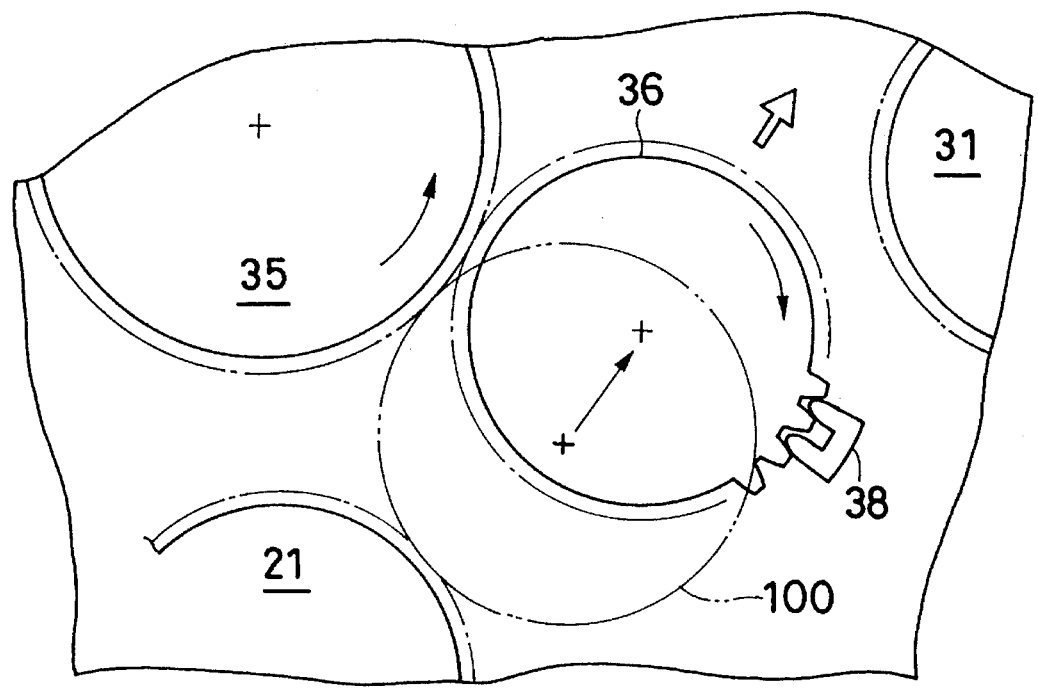
Figure 4:
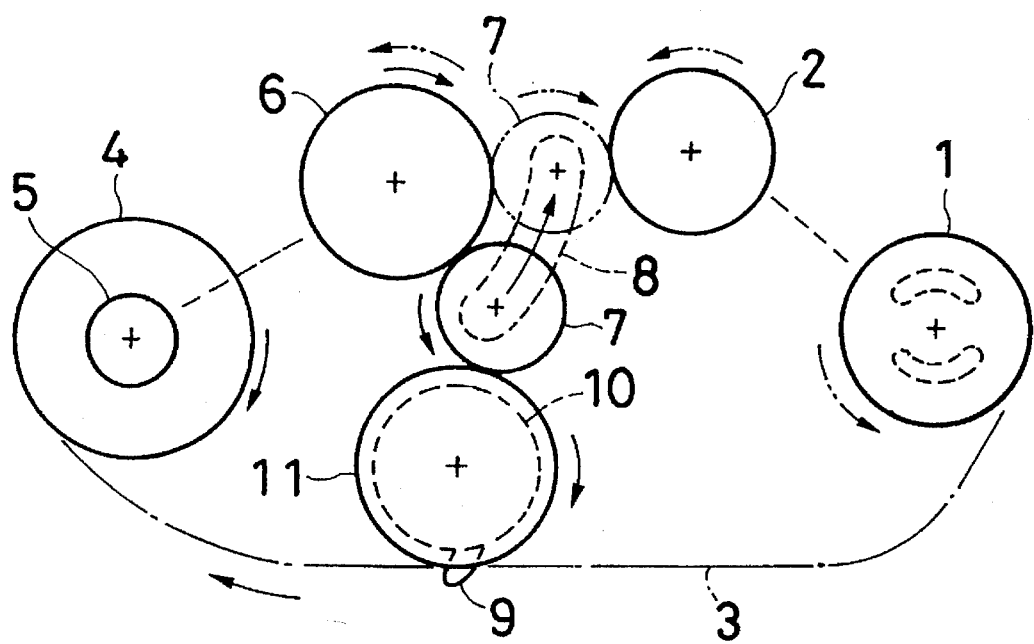
FIG. 4 shows the structure of a conventional film loading apparatus.

The operation of the embodiment having the above-described structure will now be explained with reference to FIGS. 3 (A) and 3 (B). When the film 3 is initially fed, the spool 22 shown FIG. 1 is rotated clockwise by a motor, and the sun gear 35 which is connected to the motor pinion 26 via the gear 32 to 34 is normally rotated. The planet gear 36 situated at the position indicated by the broken line in FIG. 1 is thereby reversely rotated and meshes with the stopper 38. In this state, the planet gear 36 moves downward and meshes with the feeding gear 21. As a result, the one-tooth sprocket 20 is normally rotated. The pawl tooth 19 of the one-tooth sprocket 20 is engaged with the perforation 23 of the film 3 shown in FIG. 2, and the film 3 is fed toward the spool 22. The film 3 fed in this manner is caught by the catches 24 of the spool 22 and wound around the spool 22.

During this initial film feeding operation, the planet gear 36 is sometimes sent flying toward the rewinding gear 31, for example, when the pawl tooth 19 is disengaged from the perforation 23 of the film 3 and when the pawl tooth 19 is engaged with the perforation 23 after strongly pressing the film 3. In such a case, the movement of the planet gear 36 is stopped by the stopper 38. FIG. 3 (A) shows this state. When the planet gear 36 is sent flying from the position indicated by the broken line 100 toward the rewinding gear 31, since a tooth of the planet gear 36 comes into contact with a tooth of the stopper 38, the movement of the planet gear 36 is stopped at this position and the planet gear 36 returns to the original position. Therefore, the planet gear 36 which is sent flying does not mesh with the rewinding gear 31 and the initial film feeding operation is prevented from stopping, thereby enabling a smooth film loading operation.

When the film 3 is rewound after it is fully exposed, since the sun gear 35 is reversely rotated by a reverse rotation of the motor, the planet gear 36 is normally rotated, and it is moved from the position indicated by the broken line 100 at which the planet gear 36 meshes with the feeding gear 21 toward the rewinding gear 31. At this time, since the normally rotating planet gear 36 meshes with the teeth of the stopper 38, the movement of the planet gear 36 is not checked by the stopper 38. When the planet gear 36 meshes with the rewinding gear 31, the fork gear 18 is reversely rotated and thus the exposed film 3 is rewound into the patrone 15.

In this embodiment, the stopper 38 has two teeth, but the stopper is not limited thereto and a stopper having one tooth or a pin stopper may be used instead. In the case of using a tooth-like stopper as in this embodiment, it is possible to produce a large stopper so that attachment of the stopper is facilitated.

Although in the planet gear mechanism in the embodiment, the planet gear 36 slides along the guide groove 37, the planet gear 36 may be connected to the sun gear 35 by a crosspiece member so as to slide between the feeding gear 21 and the rewinding gear 31.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A film loading apparatus using a planet gear comprising:

a planet gear mechanism for switching between two actuating gears which provided for two different operations; and a stopper member provided at the position at which said stopper member checks the movement of said planet gear when said planet gear is disengaged from one actuating gear and sent flying toward another actuating gear at the time of one operation and at which said stopper member engages said planet gear when said planet gear is reversely rotated and moved toward said another actuating gear.

2. A film loading apparatus using a planet gear comprising:

a feeding gear for initial film feeding;

a rewinding gear for rewinding a film;

a planet gear disposed in such a manner as to move between the position at which said planet gear meshes with said feeding gear and the position at which said planet gear meshes with said rewinding gear by changing the direction of rotation of said planet gear; and a stopper member provided at the position at which said stopper member checks the movement of said planet gear when said planet gear is disengaged from said feeding gear and sent flying toward said rewinding gear at the time of initial film feeding and at which said stopper member engages said planet gear when said planet gear is reversely rotated and moved toward said rewinding gear.

3. A film loading apparatus according to claim 2, wherein said stopper member is a tooth-like member which meshes with said planet gear when said planet is moved from said feeding gear toward said rewinding gear, 4. A film loading apparatus using a planet gear comprising:

a one-tooth sprocket which engages a perforation of a film for the purpose of initial film feeding;

a feeding gear integrally provided with said one-tooth sprocket;

a fork gear which engages the take-up shaft of a film patrone;

a rewinding gear connected to said fork gear via a gear train;

a motor for winding said film around a spool for every exposure;

a sun gear connected to the pinion of said motor via a gear train;

a planet gear connected to said sun gear in such a manner as to move between the position at which said planet gear meshes with said feeding gear and the position at which said planet gear meshes with said rewinding gear by changing the direction of rotation of said planet gear; and a stopper member provided at the position at which said stopper member checks the movement of said planet gear when said planet gear is disengaged from said feeding gear and sent flying toward said rewinding gear at the time of initial film feeding and at which said stopper member engages said planet gear when said planet gear is reversely rotated and moved toward said rewinding gear.

* * * * *